(12) United States Patent
Foti

(10) Patent No.: US 7,984,416 B2
(45) Date of Patent: Jul. 19, 2011

(54) SYSTEM AND METHOD FOR PROVIDING CLASS DEFINITIONS IN A DYNAMICALLY TYPED ARRAY-BASED LANGUAGE

(75) Inventor: David A. Foti, Tolland, CT (US)

(73) Assignee: The MathWorks, Inc., Natick, MA (US)

( * ) Notice: Subject to any disclaimer, the term of this patent is extended or adjusted under 35 U.S.C. 154(b) by 1497 days.

(21) Appl. No.: 11/389,636

(22) Filed: Mar. 24, 2006

(65) Prior Publication Data

US 2007/0226688 A1 Sep. 27, 2007

(51) Int. Cl.
*G06F 9/44* (2006.01)

(52) U.S. Cl. .................. 717/106; 717/116

(58) Field of Classification Search .............. None
See application file for complete search history.

(56) References Cited

U.S. PATENT DOCUMENTS

| | | | |
|---|---|---|---|
| 5,280,610 A | 1/1994 | Travis, Jr. et al. | |
| 5,361,350 A | 11/1994 | Conner et al. | |
| 5,437,027 A | 7/1995 | Bannon et al. | |
| 5,692,129 A | 11/1997 | Sonderegger et al. | |
| 5,752,028 A | 5/1998 | Ellacott et al. | |
| 5,842,220 A * | 11/1998 | De Groot et al. ........... | 1/1 |
| 5,864,862 A | 1/1999 | Kriens et al. | |
| 5,920,725 A * | 7/1999 | Ma et al. ............... | 717/171 |
| 5,960,438 A | 9/1999 | Chang et al. | |
| 6,061,689 A | 5/2000 | Chang et al. | |
| 6,775,680 B2 | 8/2004 | Ehrman et al. | |
| 6,836,870 B2 | 12/2004 | Abrams | |
| 6,839,725 B2 | 1/2005 | Agesen et al. | |
| 6,901,588 B1 | 5/2005 | Krapf et al. | |
| 2002/0069400 A1* | 6/2002 | Miloushev et al. ........... | 717/108 |
| 2003/0014588 A1 | 1/2003 | Hu et al. | |
| 2003/0016220 A1* | 1/2003 | Cohen ....................... | 345/440 |
| 2003/0204517 A1 | 10/2003 | Skinner et al. | |
| 2005/0134707 A1 | 6/2005 | Perotti et al. | |
| 2005/0138609 A1 | 6/2005 | Mitchell | |
| 2005/0165807 A1 | 7/2005 | Srinivasan et al. | |
| 2005/0216885 A1 | 9/2005 | Ireland | |
| 2005/0246677 A1 | 11/2005 | Mountain et al. | |
| 2005/0262493 A1 | 11/2005 | Schmidt et al. | |

(Continued)

FOREIGN PATENT DOCUMENTS

EP 1400897 A2 3/2004

(Continued)

OTHER PUBLICATIONS

Edward Willink and Vyacheslav Muchnik. Preprocessing C++: Meta-Class Aspects. Proceedings of the Eastern European Conference on Technology of Object Oriented Languages and Systems, TOOLS EE 99, Jun. 1999. pp. 1-12.*

(Continued)

*Primary Examiner* — Michael J Yigdall
*Assistant Examiner* — Samuel Hayim
(74) *Attorney, Agent, or Firm* — Nelson Mullins Riley & Scarborough LLP

(57) ABSTRACT

A class definition syntax that leverages the array and math-oriented nature of a dynamically typed array-based programming language is discussed. The present invention provides a simplified mechanism for the creation of element-wise methods. Additionally, a mechanism for defining derived classes in a dynamically typed array-based programming language using mathematical set notation and semantics is also supported.

20 Claims, 9 Drawing Sheets

U.S. PATENT DOCUMENTS

| | | | |
|---|---|---|---|
| 2006/0004845 A1 | 1/2006 | Kristiansen et al. | |
| 2006/0136439 A1* | 6/2006 | Fuller et al. | 707/100 |
| 2006/0195460 A1 | 8/2006 | Nori et al. | |
| 2006/0200486 A1 | 9/2006 | Castro et al. | |
| 2007/0088724 A1 | 4/2007 | Demiroski et al. | |

FOREIGN PATENT DOCUMENTS

| | | |
|---|---|---|
| EP | 1569132 A1 | 8/2005 |

OTHER PUBLICATIONS

Bjarne Stroustrup. The C++ Programming Language, Special Edition. Copyright AT&T 2000. Chapter 12.*

Ido Dagan and Alon Itai. A set Expression Based Inheritance System. Annals of Mathematics and Artificial Intelligence 4, 1991 pp. 269-280.*

Philippe Mougin and Stephane Ducasse. OOPAL: Integrating Array Programming in Object-Oriented Programming. ACM 2003 pp. 1-14.*

Miller, Jim et al., "The Common Language Infrastructure Annotated Standard," Addison-Wesley (2004).

International Search Report for Application No. PCT/US2007/016169, dated May 23, 2008.

Bouraqadi-Saâdani, Noury M.N. et al., "Safe Metaclass Programming," *ACM Sigplan Notices, Association for Computing Machinery*, vol. 33(10):84-96 (1998).

Liberty, Jesse, "Programming C#," O'Reilly®, Valerie Quercia Ed. (2001).

Invitation to Pay Additional Fees for Application No. PCT/US2007/016169, dated Jan. 28, 2008.

Van Roy, Peter et al., "Concepts, Techniques, and Models of Computer Programming," The MIT Press, Cambridge, pp. 518-537 (2004).

International Search Report for Application No. PCT/US2007/007375, dated Feb. 7, 2008.

European Office Action for Application No. 07810519.4, dated Apr. 23, 2009.

Buneman, Peter et al., "A Type System that Reconciles Classes and Extents," retrieved online at http://citeseer.ist.psu.edu/cache/papers/cs/20078/http:zSzzSzwww.jaist.ac.jpzSz~ohorizSzbune91dbpl.pdf/a-type-system-that.pdf (2007).

Capponi, Cécile, "Design and Implementation of a Type System for a Knowledge Representation System," retrieved online at http://citeseer.ist.psu.edu/cache/papers/cs/14900/ftp:zSzSzftp.inria.frzSzINRIAzSzpublicationzSzpubli-ps-gzzSzRRzSzRR-3096.pdf/capponi97design.pdf (1997).

Dagan, Ido et al., "A Set Expression Based Inheritance System," *Annals of Mathematics and Artificial Intelligence*, vol. 4:269-280 (1991).

Girardot, Jean Jacques et al., "An Object Oriented Extension to APL," *Proceedings of the International Conference on APL: APL in transition*, pp. 128-137 (1987).

Mougin, Philippe et al., "OOPAL: Integrating Array Programming in Object-Oriented Programming," retrieved online at http://www.fscript.org/documentation/OOPAL.pdf (2007).

Invitation to Pay Additional Fees for Application No. PCT/US2007/007375, dated Oct. 26, 2007.

European Office Action for Application No. 07810519.4, dated Jul. 5, 2010.

* cited by examiner

SYSTEM AND METHOD FOR PROVIDING CLASS DEFINITIONS IN A DYNAMICALLY TYPED ARRAY-BASED LANGUAGE

FIELD OF THE INVENTION

The illustrative embodiment of the present invention relates generally to class definitions, and more particularly to a mechanism for providing class definitions using set notation and an element-wise attribute.

BACKGROUND

Many programming languages including graphical programming languages, textual programming languages and dynamically typed array-based languages, such as MATLAB from The MathWorks, Inc. of Natick, Mass., provide support for classes and object-oriented programming. Array-based languages are a natural choice to solve many different mathematical and scientific computing problems. Object-oriented programming languages support the concept of inheritance which allows new classes to be derived from existing classes. Providing object-oriented support in a dynamically typed array-based language supplies programmers with powerful tools for solving technical problems.

Unfortunately, the combination of object-oriented support in a dynamically typed array-based programming language has conventionally led to a syntax being utilized in providing class definitions that fails to take full advantage of the array properties of the array-based language. Similarly, the conventional syntax has also failed to combine inheritance with arrays in an efficient manner. It would be desirable to provide a class definition syntax for a dynamically typed array-based programming language and other types of programming languages that enables the efficient definition of derived classes while also leveraging the array-based nature of the dynamically typed array-based programming language.

BRIEF SUMMARY

The illustrative embodiment of the present invention provides a class definition syntax that leverages the array and math-oriented nature of a dynamically typed array-based programming language. The present invention provides a simplified mechanism for the creation of element-wise methods. Additionally, a mechanism for defining derived classes in a dynamically typed array-based programming language as well as other types of textual and graphical programming languages using mathematical set notation is also supported.

In one aspect of the present invention in a computing environment supporting a programming language, a method of defining classes includes the step of providing a language processor for the programming language. The language processor supports the use of at least one type of set notation during class definitions. The method also defines a class using at least one type of set notation supported by the language processor.

In an aspect of the present invention in a computing environment supporting a programming language, a system for defining classes includes a language processor for a programming language. The language processor supports the use of at least one type of set notation during class definitions. The system also includes a class defined using the types of set notation supported by the language processor.

In another aspect of the present invention in a computing environment supporting a dynamically typed array-based language, a method of defining classes includes the step of providing a language processor for the dynamically typed array-based language. The language processor supports the use of an element-wise attribute applicable to a method that performs an action on every element of an array. The method additionally includes the step of defining a class having a method created with the element-wise attribute supported by the language processor.

In an aspect of the present invention in a distributed computing environment supporting a dynamically typed array-based language, a method of defining classes, includes the step of providing a language processor for a dynamically typed array-based language on a second computing device. The language processor supports the use of at least one type of set notation during class definitions. The method additionally establishes a communication channel between a first computing device and the second computing device over a network. The method also enters commands from the first computing device that define a class using the type of set notation supported by the language processor and transmit the commands over the communication channel to the second computing device.

In an additional aspect of the present invention, a system for supporting a dynamically typed array-based language includes a language processor for a dynamically typed array-based language. The language processor supports the use of an element-wise attribute applicable to a method that performs an action on every element of an array. The system also includes a method defined in a class in which the method is created with the element-wise attribute supported by the language processor.

BRIEF DESCRIPTION OF THE DRAWINGS

The invention is pointed out with particularity in the appended claims. The advantages of the invention described above, as well as further advantages of the invention, may be better understood by reference to the following description taken in conjunction with the accompanying drawings, in which:

DETAILED DESCRIPTION

The ability to efficiently construct class definitions with a minimal amount of code is a great benefit for class designers. The illustrative embodiment of the present invention provides the class designer with the tools necessary to efficiently and quickly construct classes that take full advantage of a dynamically typed array-based programming environment that supports object oriented programming concepts. More specifically, the present invention provides the class syntax necessary to perform element-wise operations in class methods and to quickly create derived classes using mathematical set notation.

For the purposes of illustration, a number of the examples contained herein are discussed with reference to MATLAB, a dynamically typed array-based programming language from The MathWorks, Inc. of Natick, Mass. It should be appreciated that MATLAB has been chosen as a singular example of a dynamically-typed array-based programming language and the invention should not be interpreted as being restricted solely to MATLAB. Likewise, references made herein to MATLAB should be understood to also include other dynamically typed array-based languages. It should also be appreciated that the use of set notation in the present invention as discussed herein is applicable to other textual and graphical programming languages such as the Unified Modeling Language (UML) and the System Modeling Language (SysML) in addition to being applicable to dynamically typed array-based programming languages.

Figure 1:
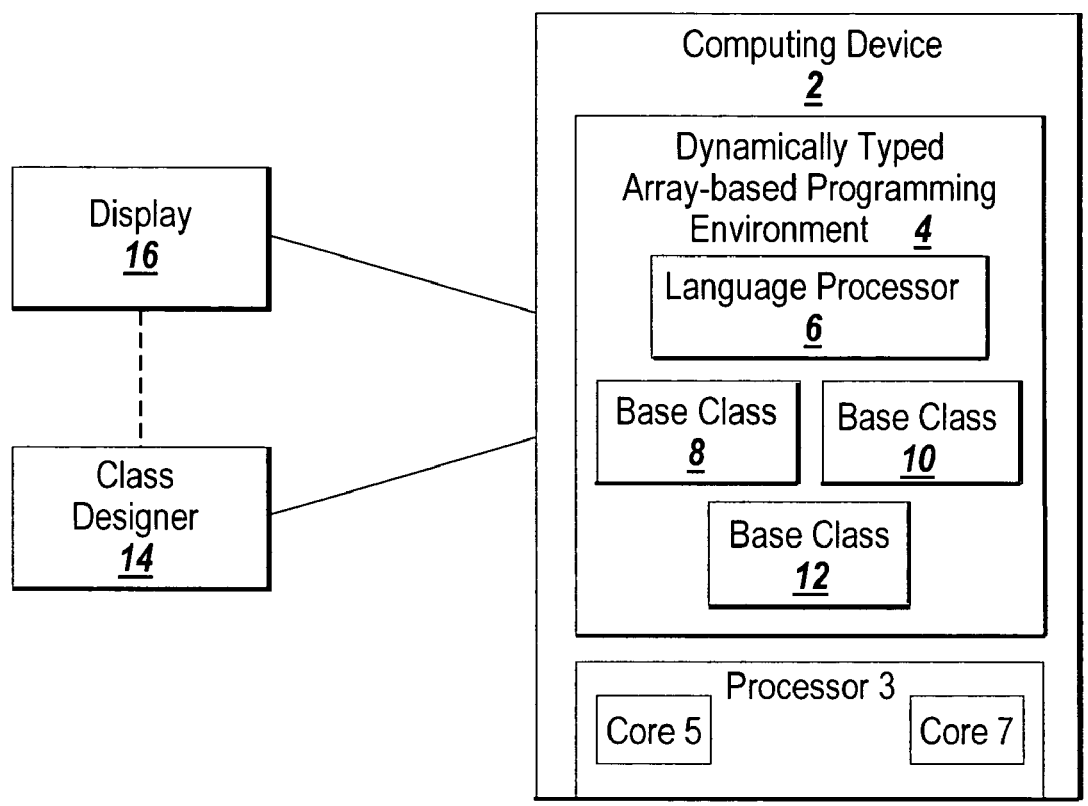
FIG. 1 depicts an environment suitable for practicing the illustrative embodiment of the present invention.

FIG. 1 depicts an environment suitable for practicing the illustrative embodiment of the present invention. A computing device 2 hosts a dynamically typed array-based programming environment 4. An exemplary computing device 2 with a dynamically typed array-based programming environment 4 is a computer executing MATLAB (It will be noted that MATLAB is referred to herein as both a high level dynamically typed array-based language and as an interactive environment. The meaning of each particular reference to MATLAB is apparent from the context of the discussion in which it takes place). The computing device 2 may be a PC, workstation, server, laptop, mainframe, PDA or other computing device equipped with a processor and capable of hosting the dynamically typed array-based programming environment 4. The computing device 2 may be a virtualized device. The computing device 2 may be equipped with a single processor, a multi-core processor, or multiple processors. By way of example, FIG. 1 shows a processor 3 with multiple cores 5 and 7. The processor may be a 32 bit processor, 64 bit processor or some other type of processor capable of executing the instructions required for the present invention, such as, for example, a graphics processing unit (GPU) or application specific hardware that is either programmable (Field Programmable Gate Array) or fixed (Application Specific Integrated Circuit).

The dynamically typed array-based programming environment 4 includes a language processor 6 capable of processing program code written in a dynamically typed array-based language. The language processor 6 supports the use of an element-wise attribute for methods defined in a class that specifies operations to be carried out on all elements in an array and set notation in class definitions that facilitates class inheritance. The element-wise attribute and set notation are discussed in further detail below. The dynamically typed array-based programming environment 4 may also include previously defined base classes 8, 10 and 12 which may be referenced by a class designer 14 using the set notation of the present invention to derive new classes. The class designer 14 may interact with the dynamically typed array-based programming environment 4 via a display 16 that is in communication with the computing device 2.

Figure 2:
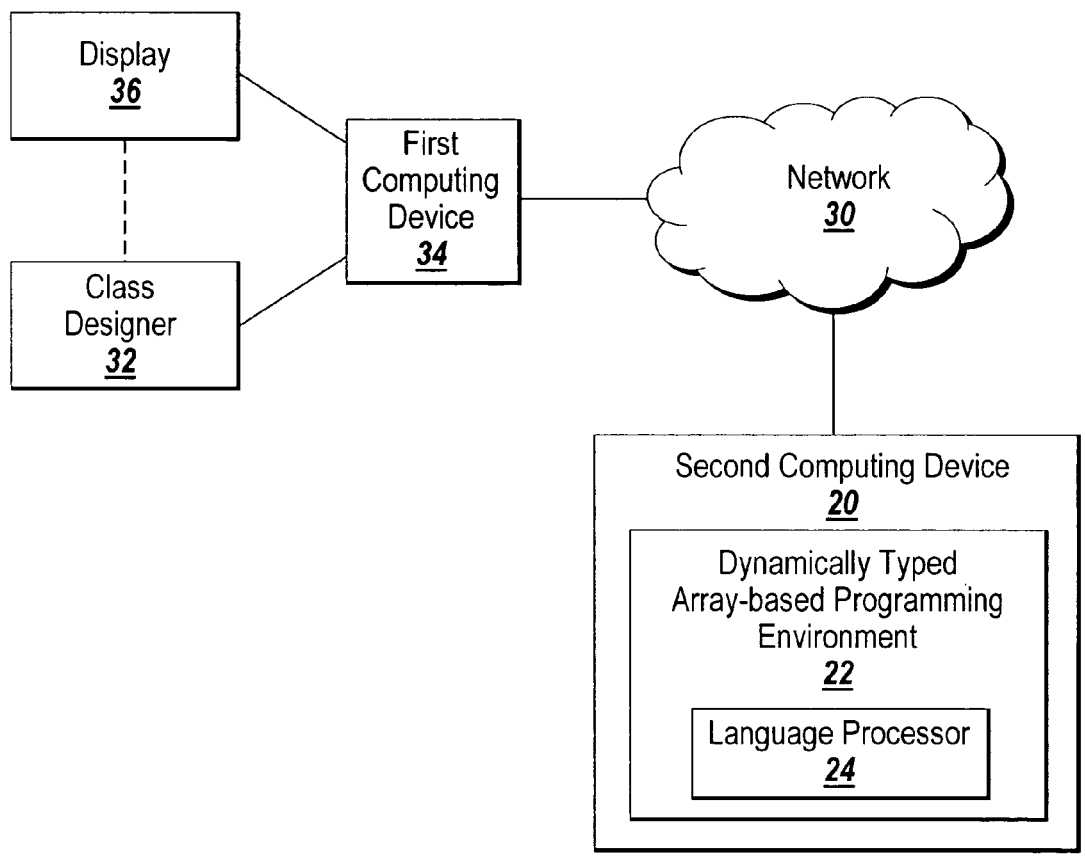
FIG. 2 depicts an alternate distributed environment suitable for practicing the illustrative embodiment of the present invention.

Those skilled in the art will recognize that the illustrative embodiment of the present invention may be implemented using other architectures than that shown in FIG. 1. For example, one such alternate implementation of the illustrative embodiment may be implemented in a distributed architecture such as that shown in FIG. 2. A class designer 32 accesses a first computing device 34 and an associated display device 36. The first computing device 34 communicates over a network 30 with a second computing device 20. The second computing device 20 hosts a dynamically typed array-based programming environment 22. The dynamically typed array-based programming environment 22 includes a language processor 24. The class designer 32 enters commands on the first computing device 34 that are transmitted to the second computing device 20 for execution. The results of the execution of the class designer's commands are then transmitted over the network 30 to the first computing device 34 where they are displayed for the user on the display device 36. The second computing device 20 and other components in the distributed architecture may be virtual components. The network 30 may be the Internet, a local area network (LAN), a wide area network (WAN), a wireless network, an intranet, an extranet or some other type of network. It will be appreciated by those skilled in the art that other distributed and parallel architectures enabling the execution of the invention described herein are also within the scope of the invention.

Class designers frequently wish to define one class in terms of another because it is simpler to define a new class in terms of an existing class and simpler to learn how to use such a new class if there is already familiarity with the existing class. The illustrative embodiment of the present invention allows a class designer to use set notation to create a new class where the new class is referred to as a subclass of the first class and the first class is referred to as a superclass. The use of mathematical set notation allows the class designer to recognize that the subclass defines a set of class instances that represent a subset of the superset of class instances defined by the superclass.

Set notation may be used to create a new subclass from a single class or to indicate that a derived class multiply inherits from two or more base classes. In conventional systems supporting multiple inheritance such as C++ (See for example, Bjarne Stroustrup's "The C++ Programming Language, $3^{rd}$ Edition"), a class A may inherit from a class B multiple times. This conventional model of inheritance is not based on sets because a member of the set defined by class B cannot be a member of the set defined by class A multiple times. The C++ model leads to confusion about how to refer to the properties and methods of each separate instance of class A that is embedded in class B. In contrast, the illustrative embodiment of the present invention provides an inheritance model based on sets that defines multiple inheritance such that if a class C inherits from classes A and B, then C defines a subset of the union of A and B. The use of set notation provides that if class B is defined as subclass of A and A, this is equivalent to defining a subset of the set union of A and A which is A. There is no confusion created by a subclass having multiple copies of a base class because a subclass cannot have multiple copies of a base class.

While a class defines a set of objects (or potential objects) with certain common attributes such as method and property names, a subclass defines a subset of objects sharing some additional attributes, such as additional property names. The subclass is often a more specialized form of the superclass. For example, consider a Rectangle class that is specified in terms of width and height dimensions. For a particular application, it may be more convenient to specify rectangles using opposite corners rather than one corner and width/height dimensions. With the use of the subclass, a class designer does not have to redefine the entire class (including the methods that don't deal with corners). Instead, the class designer may create a subclass of the Rectangle class that supports four corners as follows:

```
classdef CornerRectangle < Rectangle
    properties(Computed = true)
        X2, Y2
    end
    methods
        function X2 = get.X2(r)
            X2 = r.X + r.Width;
        end
        function set.X2(r, X2)
            r.Width = X2 – r.X;
        end
        function Y2 = get.Y2(r)
            Y2 = r.Y + r.Height;
        end
        function set.Y2(r, Y2)
            r.Height = Y2 – r.Y;
        end
    end
end
```

The '<' sign is used in the example above to suggest subset. By defining CornerRectangle as a subclass of Rectangle, there is no need to repeat any of the properties or methods already defined by Rectangle since CornerRectangle inherits these properties and methods from Rectangle. One advantage of subclassing is that it provides many possible ways to avoid code duplication by reusing existing code. For example, common code from the two classes may be put into a method on the base class and called by methods of the derived class. The existence of a sub-classing relationship also makes it easier to document and use the Rectangle and CornerRectangle classes. A user familiar with the Rectangle class will be able to use instances of CornerRectangle without learning anything new.

The set notation described above may also be used to define meta classes. For example, Shape (Rectangle) where shape is a meta class that is instantiated as a class definition by a constructor with argument 'Rectangle'.

The illustrative embodiment of the present invention also allows for mathematical set notation to be used to specify that a derived class multiply inherits from two or more base classes. Just as one can take the union and intersection of sets, one can talk about the union and intersection of classes. A class definition can use an equivalence relationship to give a name to a union or intersection of other classes. For example, suppose a number of functions require their inputs to be either single or double. Rather than having expressions like:

if class(x)<(single|double)

A class named float may be defined as the union of single and double:

classdef float=single|double,end where the symbol '|' represents a union operation and the expression may then read:

if(class(x)<float)

Intersection classes may be defined in the same way. Intersection classes can be used to require that an object have a certain set of traits where each trait is defined by a class. For example, suppose that a GUI library exists in which there are the following general abstract widget classes:
   Button
   Switch
   Slider
   Dial Now suppose that there are also classes that describe what kind of states are possible in Widgets. These classes are:
   BooleanState
   IntegerState
   FractionState
   FloatState Actual concrete widgets may then be derived from combinations (intersections) of one class from each of the above groups. Thus:
   classdef ToggleButton<Button & BooleanState
   classdef LightButton<Button & BooleanState
   classdef RoundFractionDial<Dial & FractionState
   classdef ColorSlider<Slider & IntegerState The symbol '&' is used to denote set intersection in the example above. Those skilled in the art will recognize that the actual indicator used to indicate the set notation operation (e.g. union "|", intersection "&", etc.) is an implementation choice. Similarly, although the examples above have used the mathematical less than sign ("<") in order to indicate a class is a subclass of one or more classes, it will be appreciated that other indicators may be substituted without departing from the scope of the present invention.

It will be appreciated that the examples mentioned above are illustrations of a small portion of the type of set operations that may be triggered through the use of set notation by the illustrative embodiment of the present invention. For example, a sub-class may be defined using set notation so that it inherits properties from a set made of multiple other sets. Likewise, a class being defined using the set notation of the present invention may be a sub class that inherits only interface methods of a class without inheriting the implementation of the methods. Similarly the properties that are inherited by the subclass may be limited by constraints referenced by the set notation.

Figure 3:
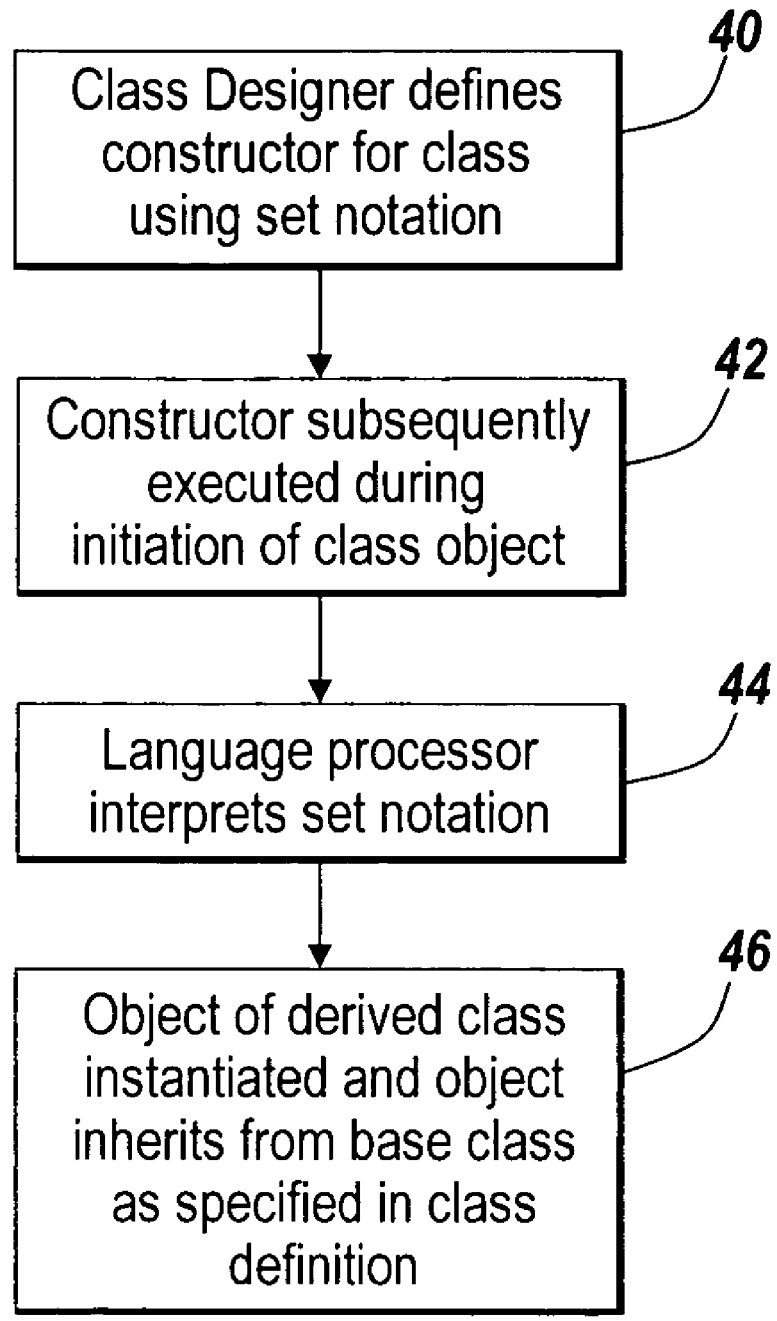
FIG. 3 is a flowchart of a sequence of steps followed by the illustrative embodiment of the present invention to derive classes using set notation.

FIG. 3 is a flowchart of a sequence of steps followed by the illustrative embodiment of the present invention to derive classes using set notation. The sequence begins when the class designer defines a constructor for the class using set notation (step 40). The set notation may indicate that the class is derived from an intersection or union of two base classes. Subsequently, the constructor is called during the instantiation of a class object (step 42) and the language processor interprets the set notation (step 44). An object of the derived class is then instantiated with the object inheriting from the base classes as specified in the class definition.

The illustrative embodiment of the present invention may also be extended to other textual and graphical programming languages in addition to dynamically typed array-based programming languages. Graphical programming languages include UML, SysML, Modelica, Dymola, VHDL and VHDL-AMS as well as SIMULINK from The MathWorks, Inc. of Natick, Mass. FIGS. 4A-4D illustrate an example of the use of the set notation of the present invention in a graphical programming language.

The blocks in a graphical modeling library may be thought of as a class, instances of which are instantiated when placed in a graphical model. A graphical modeling library may include a template block for a configurable subsystem template. The configurable subsystem template block may link to other blocks in the graphical modeling library. Upon selection of linked blocks, the linked blocks will be used in place of the template block in the graphical model. The definition of the configurable subsystem template block in the library may include set notation indicating which blocks the configurable subsystem can be linked to by means of reference to other subsystem templates.

Figure 4A:
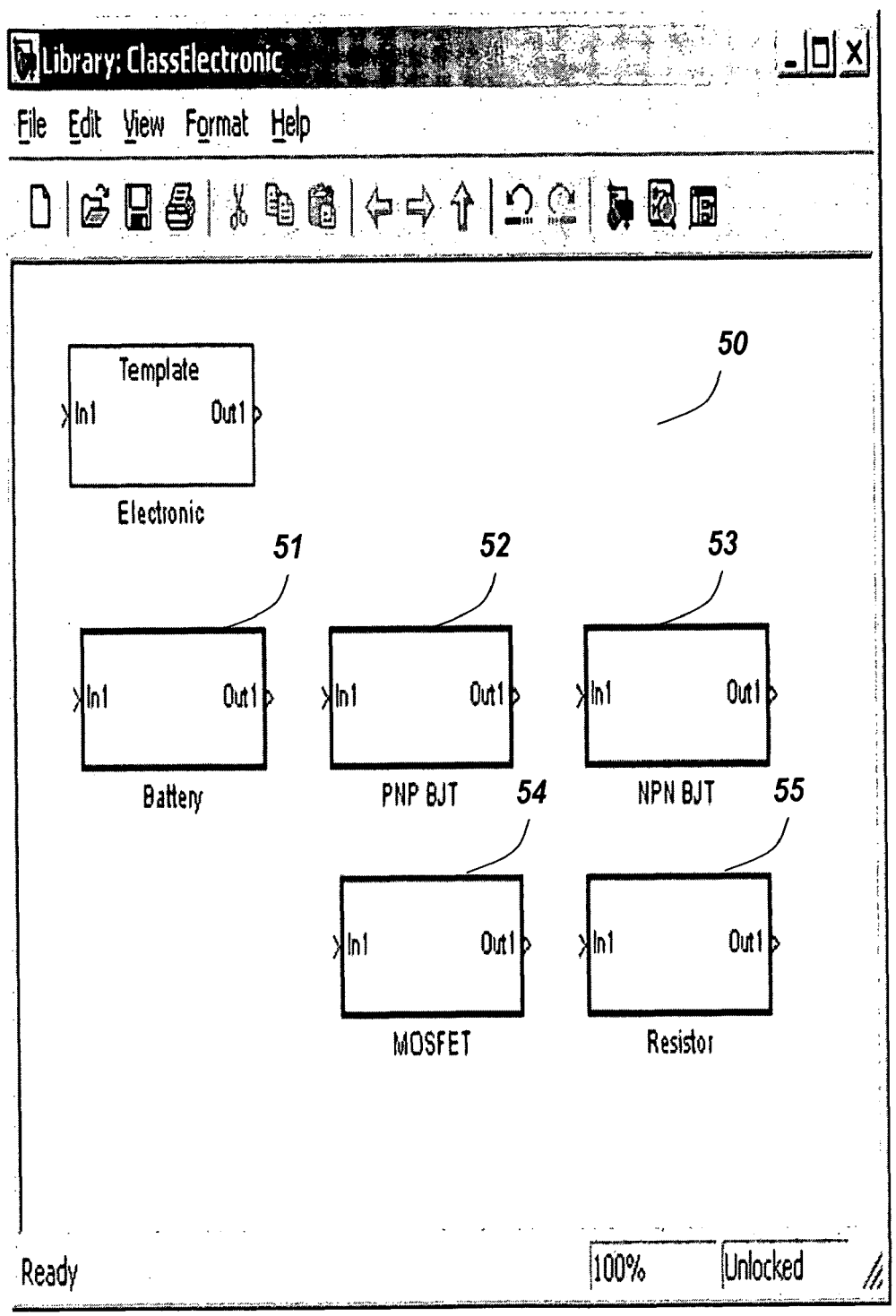
FIG. 4A depicts a model class electronic.
Figure 4B:
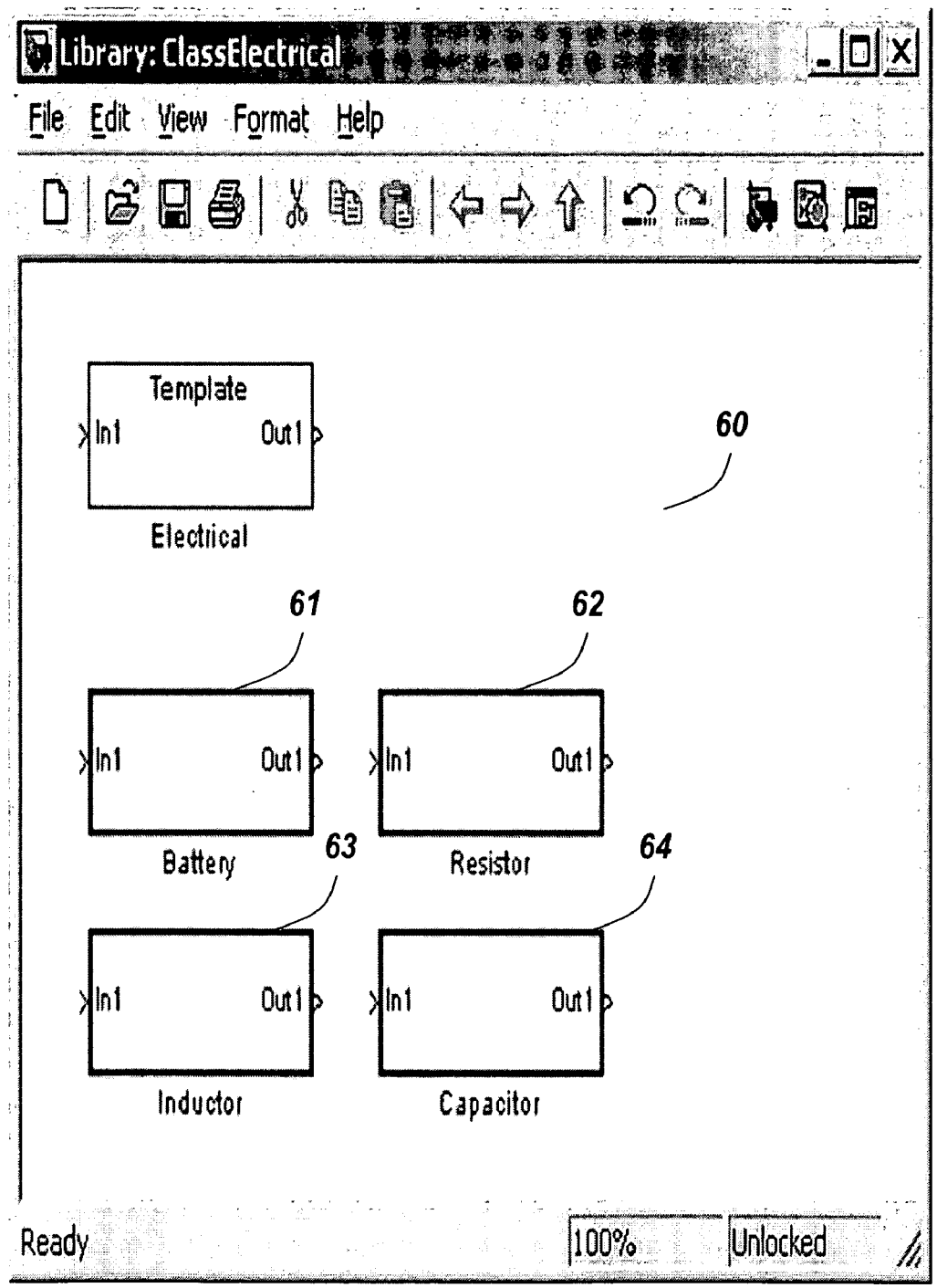
FIG. 4B depicts a model class electrical.
Figure 4C:
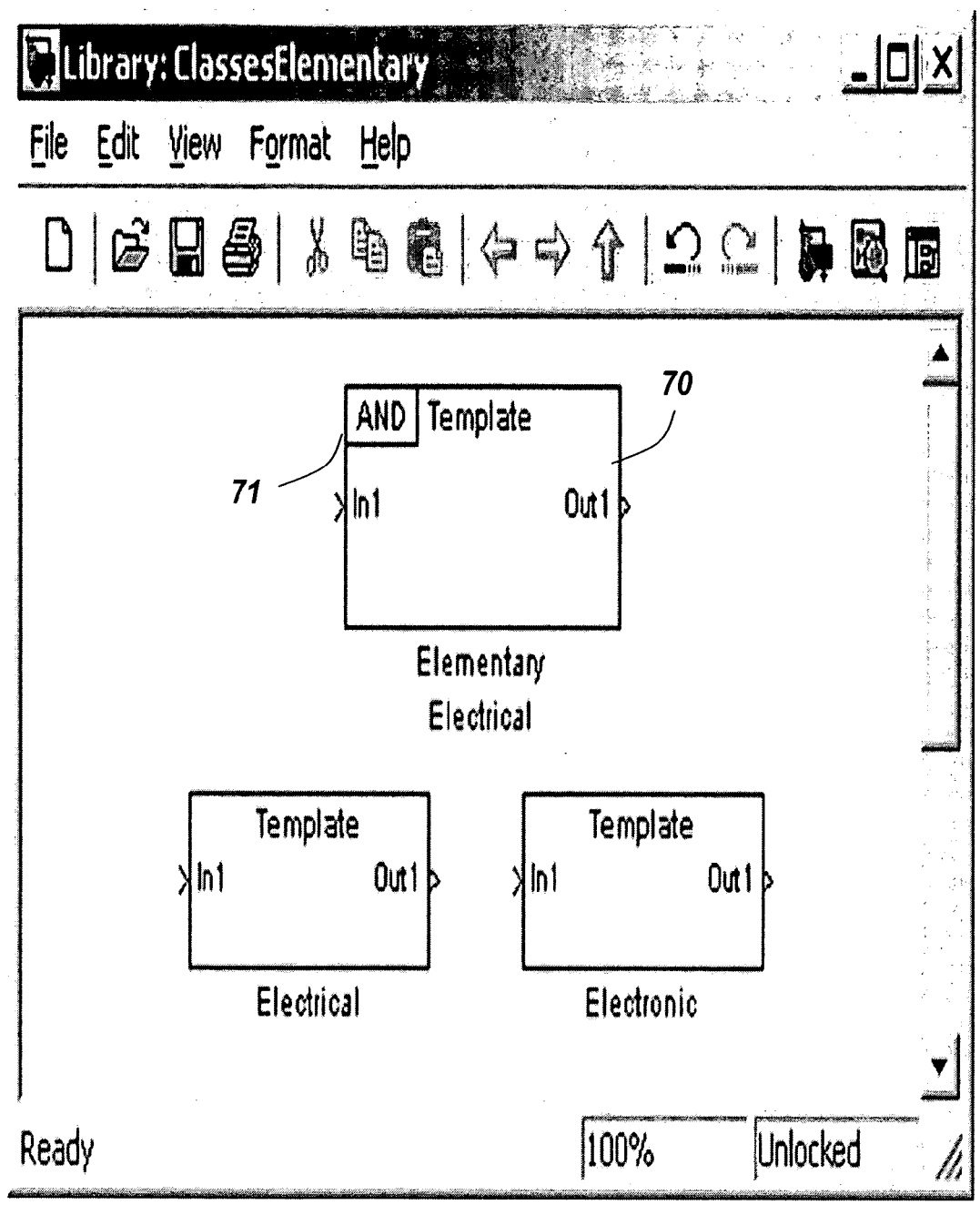
FIG. 4C depicts a configurable subsystem template block in a model library that uses set notation to reference the intersection of the classes depicted in FIGS. 4A and 4B.
Figure 4D:
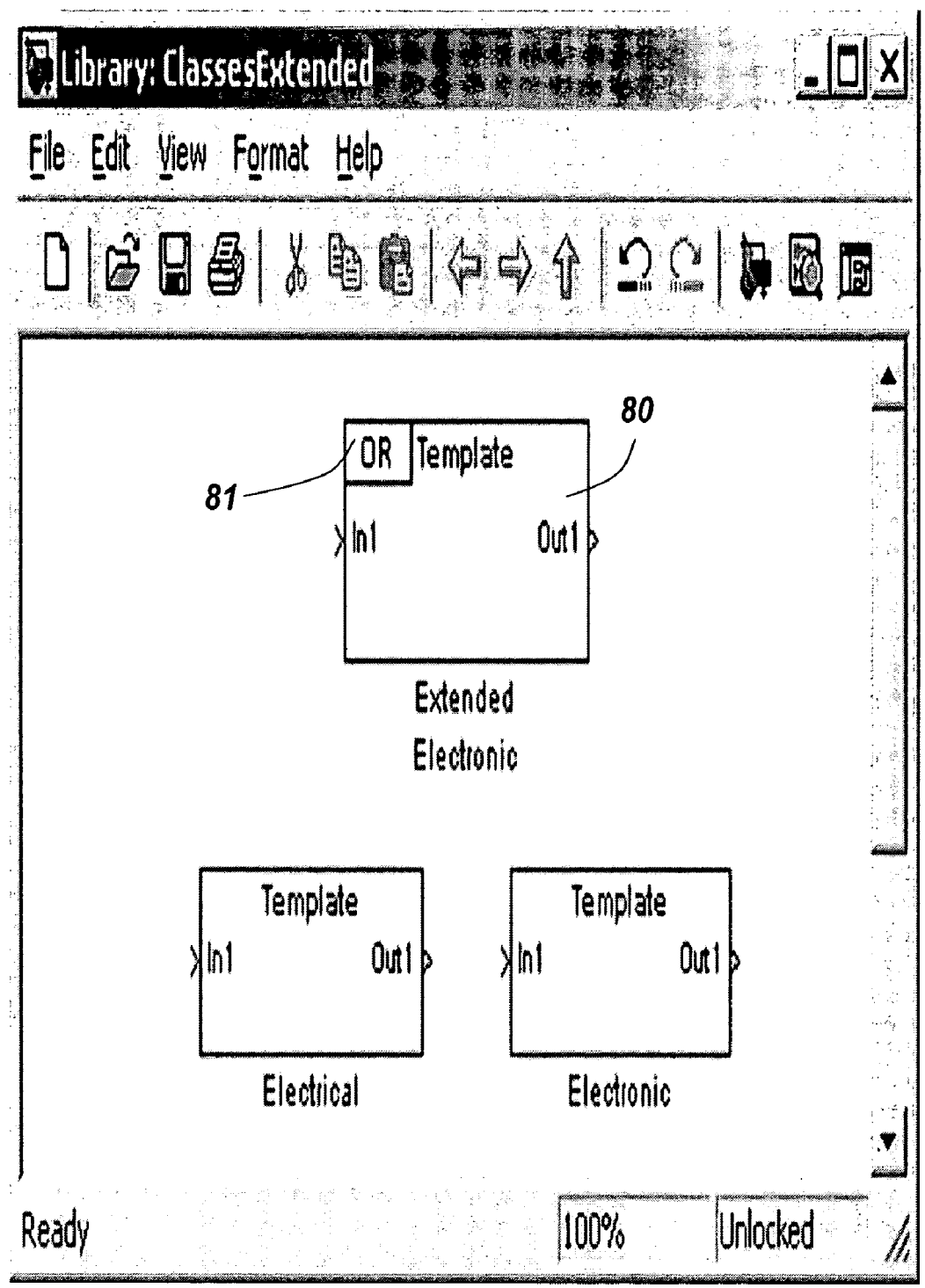
FIG. 4D depicts a configurable subsystem template block in a model library that uses set notation to reference the union of the classes depicted in FIGS. 4A and 4B.

By way of example of the use of set notation for class definition in a graphical modeling language, FIG. 4A depicts a class electronic 50 in the model library ClassElectronic that includes a battery block 51, a PNP BJT block 52, an NPN BJT block 53, a MOSFET block 54 and a Resistor Block 55. FIG. 4B depicts a class electrical 60 that includes a battery block 61, a resistor block 62, an inductor block 63 and a capacitor block 64. The elements in the class electronic 50 and class electrical 60 may be instantiated from another class or directly imported. For example, the Resistor Block may be an element defined elsewhere that is referenced by the class electronic 50 and class electrical 60. When the intersection of the two classes is determined, the resistor is identified to be one and the same element because the blocks in the different sets reference the same underlying element. Alternately, a pure syntactic check can be done by considering an element to be the same if it has the same name in the two sets that are being intersected. Other methods may also be applied to identify identical elements such as checking whether the interface and/or properties are identical. FIG. 4C depicts a configurable subsystem template block 70 that uses set notation ("and") 71 to reference the two classes depicted in FIGS. 4A and 4B. As a result of the use of the set notation, the instantiated configurable subsystem block will include the blocks from the intersection of the two classes depicted in FIGS. 4A and 4B, battery and resistor, since the "and" indicates the blocks must be in the first class and the second class. Similarly, FIG. 4D depicts a configurable subsystem template block 80 which uses set notation ("or") 81 to reference the two classes depicted in FIGS. 4A and 4B. As a result of the use of the set notation, the instantiated configurable subsystem block will include the blocks from the union of the two classes depicted in FIGS. 4A and 4B, all the blocks in both classes, since the "or" indicates the blocks must be in either the first class or the second class.

The illustrative embodiment of the present invention also provides a syntax that leverages the array-based capabilities of the dynamically typed array-based language. In general in MATLAB and other array-based languages, all values may be arrays and support array indexing. User-defined classes are also arrays unless array operations are explicitly overridden to prohibit array formation and indexing. Thus, class methods must expect that input arguments may be object arrays. There are many methods where invocation on an array is the same as looping over each element and performing the operation on each element (referred to as an "element-wise" operation). Element-wise operations include element-wise binary operations such as plus and minus where the result of the operation is an array having the same dimensions as the array input parameters and where each element in the output array is the result of a scalar operation performed on corresponding elements of the input arrays. In general, element-wise methods perform an operation on one or more input parameters to produce one or more output parameters where each output parameter is a concatenation of results produced by applying the method to corresponding elements of each input parameter. Input parameters may be scalar in which case all such scalar values are passed to the method with each element of the non-scalar parameters.

The illustrative embodiment of the present invention provides an element-wise attribute which may be utilized by the class designer to automate the process of implementing element-wise methods in the class. During the creation of a method for the class, the class designer assigns the new method the element-wise attribute. With the element-wise attribute, the method is written as if it always takes and returns scalar objects. If the method is passed object arrays, the language processor notes the element-wise attribute assigned to the method and performs an element-wise operation on the array object. The separate results from the performance of the element-wise operation are concatenated into a single array result. The element-wise attribute can be used when the method follows the following rules:

all input values belonging to the class defining the method are either scalar or arrays of the same size;

all results that belong to the class defining the method are arrays of the same size as the input arrays; and each element in all such resulting arrays is simply the element-wise operation applied to the corresponding elements in the input arrays.

Those skilled in the art will recognize that alternate rules may be applied to the use of the element-wise attribute without departing from the scope of the present invention.

An exemplary Rectangle class to which the element-wise attribute is applied is set forth below.

```
classdef Rectangle
    properties
        X=0, Y=0, Width=0, Height=0
    end
    methods(ElementWise=true)
        function .expand(r, expansion)
            % expand expands the rectangle in all directions
            % The input rectangle r is modified such that the rectangle
            % gets larger in all directions by expansion.
            r.X = r.X – expansion;
            r.Y = r.Y – expansion;
            r.Width = r.Width + expansion * 2;
            r.Height = r.Height + expansion * 2;
        end
    end
    methods(ElementWise=true)
        function r3 = plus(r1, r2)
            if(r1.X < r2.X)
                r3.X = r1.X;
                r3.Width = max(r1.Width, r2.X + r2.Width – r1.X);
            else
                r3.X = r2.X;
                r3.Width = max(r2.Width, r1.X + r1.Width – r2.X);
            end
            if(r1.Y < r2.Y)
                r3.Y = r1.Y;
                r3.Height = max(r1.Height, r2.Y + r2.Height – r1.Y);
            else
                r3.Y = r2.Y;
                r3.Height = max(r2.Height, r1.Y + r1.Height – r2.Y);
            end
        end
    end
end
```

Figure 5:
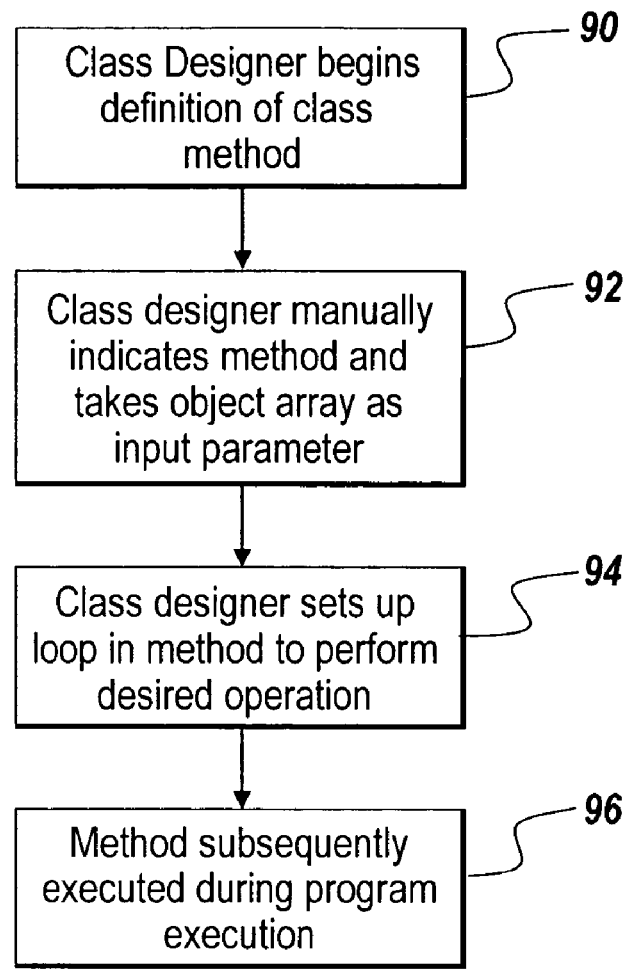
FIG. 5 (prior art) is a flowchart of a sequence of steps conventionally followed to perform element-wise operations.
Figure 6:
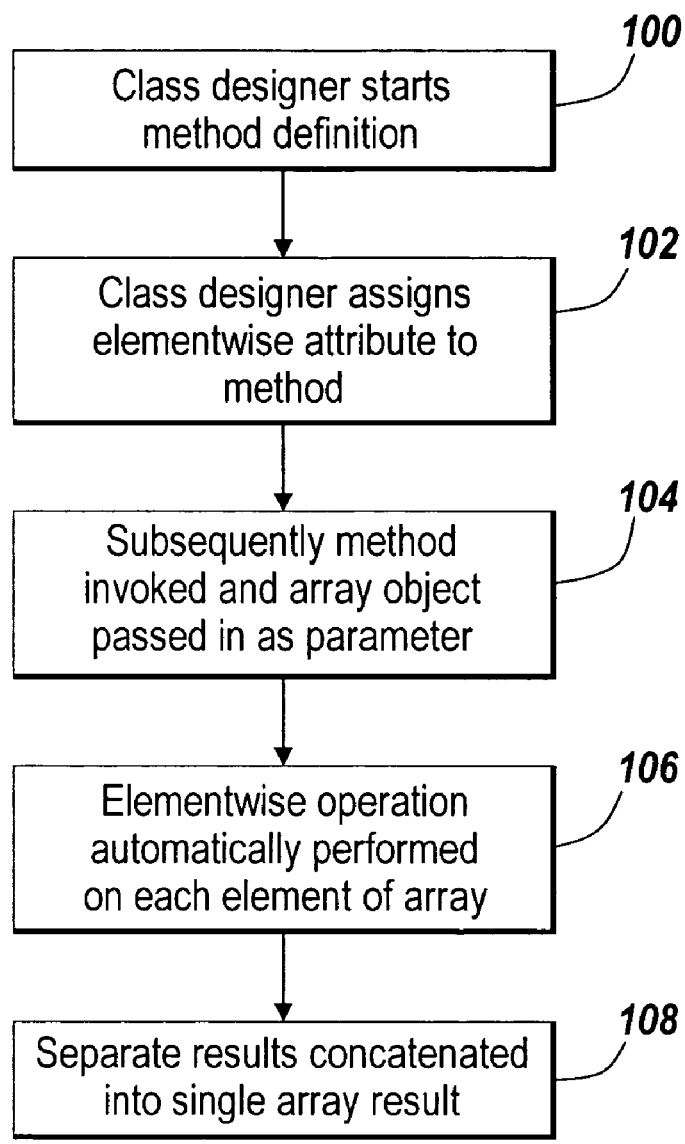
FIG. 6 is a flowchart of a sequence of steps followed by the illustrative embodiment of the present invention to declare and use a method with an element-wise attribute.

Once the class is defined, rectangle array objects based on the class may be instantiated and operations may be performed on the objects such as:

R1(1,1)=Rectangle;
R1(2,1)=Rectangle;
R1(1,2)=Rectangle;
R1(2,2)=Rectangle;
R1(1,1)·Width=10;
R1(2,1)·Width=20;
R1(1,2)·Width=30;
R1(2,2)·Width=40;
R2=Rectangle;
R2·X=10;
R2·Y=10;

R2·Width=50;
R2·Height=50;
R1·expand(10);
R3=R1+R2;

FIGS. 5 and 6 represent the sequence of steps followed by class designers conventionally and when utilizing the present invention to define methods with element-wise operations. FIG. 5 sets out a typical conventional procedure for defining methods that perform element-wise operations. Conventionally, the class designer would begin the definition of the class method (step 90) and then manually indicate that the method should take an object array as an input parameter (step 92). The class designer would then set up in the method definition an iterative loop that would be used to perform the element-wise operation (step 94). The method was then available to be called during a subsequent program execution (step 96).

In one aspect of the invention, arrays of classes may be used. For example, a model of the application windows on the graphical interface of a computing device may consist of an array of rectangles that indicate the window outlines. This could be modeled using a parameterized constructor that returns an array. In one example, the command 'screen=Rectangle(5)' may be issued to instantiate a variable 'screen' with 5 elements of type Rectangle.

In another aspect, set, list, and array constructors such as set comprehension may be applied. For example, classdef=numbers (1:10 & 1:2:10 & 1:3:10)

results in a class 'numbers' that is represented by a set with the elements 1 and 7, which is the intersection of the sets $\{1, 2, 3, 4, 5, 6, 7, 8, 9, 10\}$, $\{1, 3, 5, 7, 9\}$ and $\{1, 4, 7, 10\}$. Note that the sets used in the intersection can be constructed based on comprehensions, in which case a prefix notation can be employed to indicate the set operations such as intersection and union.

FIG. 6 depicts the sequence of steps followed by the illustrative embodiment of the present invention to declare and use a method with an element-wise attribute. The sequence begins when the class designer begins the definition of a method for a class that is being defined (step 100). The class designer assigns the element-wise attribute to the method (step 102). Those skilled in the art will appreciate that this assignment of the attribute may be done by the use of keyword that is recognizable by the language processor. A programmer may subsequently invoke the method in a program and pass the method an object array as an input parameter (step 104). Because of the use of the element-wise attribute in the method definition, the method is set to receive an object array as an input parameter. The input object array automatically has an element-wise operation performed on it by the method (step 106). Those skilled in the art will recognize that the type of operation will depend on the method definition. The separate results of the element-wise operations are then concatenated into a single array result (step 108).

The present invention may be provided as one or more computer-readable programs embodied on or in one or more mediums. The mediums may be a floppy disk, a hard disk, a compact disc, a digital versatile disc, a flash memory card, a PROM, a RAM, a ROM, or a magnetic tape. In general, the computer-readable programs may be implemented in any programming language. Some examples of languages that can be used include MATLAB, FORTRAN, C, C++, C#, JAVA, and UML. The software programs may be stored on or in one or more mediums as object code.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

I claim:

1. In a computing environment supporting a programming language, a method of defining classes, comprising:
    providing a language processor for the programming language, the language processor supporting the use of at least one type of set notation during class definitions; and
    defining a class using the at least one type of set notation supported by the language processor, the class being defined as a subclass of at least two base classes and the set notation indicating the subclass is formed from an intersection or union of at least two of the base classes.

2. The method of claim 1 wherein the class being defined is a subclass of at least three base classes.

3. The method of claim 1 wherein the programming language is an object-oriented programming language and the subclass inherits properties from the at least two base classes.

4. The method of claim 3 wherein the inheritance of properties is subject to constraints.

5. The method of claim 1 wherein the programming language is an object-oriented programming language and the subclass multiply inherits properties from the at least two base classes.

6. The method of claim 1 wherein the programming language is an object-oriented programming language.

7. The method of claim 1 wherein the class is defined using a constructor.

8. The method of claim 1 wherein the programming language is at least one of a dynamically typed array-based language, a graphical language or a textual language.

9. The method of claim 1 wherein the class is a meta class.

10. The method of claim 1 wherein the class being defined is a sub-class of a set of sets.

11. The method of claim 1 wherein the set notation causes the sub-class to inherit interface methods of a class without inheriting the implementation of the methods.

12. A non-transitory computer-readable medium holding computer-executable instructions for defining classes in a computing environment supporting a programming language, the instructions when executed causing at least one computing device to:
    provide a language processor for the programming language, the language processor supporting the use of at least one type of set notation during class definitions; and
    define a class using the at least one type of set notation supported by the language processor, the class being defined as a subclass of at least two base classes and the set notation indicating the subclass is formed from an intersection or union of at least two of the base classes.

13. The medium of claim 12 wherein the programming language is at least one of the group of a dynamically typed array-based language, a graphical language or a textual language.

14. The medium of claim 13 wherein the dynamically typed array-based language is an object-oriented programming language and the subclass inherits properties from the at least two base classes.

15. The medium of claim 12 wherein the programming language is an object-oriented programming language and the subclass multiply inherits properties from the at least two base classes.

16. The medium of claim 12 wherein the programming language is an object-oriented programming language.

17. The medium of claim 12 wherein the set notation causes the sub-class to inherit interface methods of a class without inheriting the implementation of the methods.

18. In a computing environment provided by a computer and supporting a programming language, a system for defining classes, comprising:
 a computing device executing a computing environment that includes:
  a language processor for a programming language, the language processor supporting the use of at least one type of set notation during class definitions; and
  a class defined using the at least one type of set notation supported by the language processor, the class being defined as a subclass of at least two base classes and the set notation indicating the subclass is formed from an intersection or union of at least two of the base classes.

19. In a distributed computing environment supporting a dynamically typed array-based language, a method comprising:
 providing a language processor for a dynamically typed array-based language on a second computing device, the language processor supporting the use of at least one type of set notation during class definitions;
 establishing a communication channel between a first computing device and the second computing device over a network;
 entering one or more commands to define a class from the first computing device using the at least one type of set notation supported by the language processor, the class being defined as a subclass of at least two base classes and the set notation indicating the subclass is formed from an intersection or union of at least two of the base classes; and
 transmitting the commands over the communication channel to the second computing device.

20. An apparatus comprising:
 means for providing a language processor for a programming language, the language processor supporting the use of at least one type of set notation during class definitions; and
 means for defining a class using the at least one type of set notation supported by the language processor, the class being defined as a subclass of at least two base classes and the set notation indicating the subclass is formed from an intersection or union of at least two of the base classes.

* * * * *

UNITED STATES PATENT AND TRADEMARK OFFICE
CERTIFICATE OF CORRECTION

| | | |
|---|---|---|
| PATENT NO. | : 7,984,416 B2 | Page 1 of 1 |
| APPLICATION NO. | : 11/389636 | |
| DATED | : July 19, 2011 | |
| INVENTOR(S) | : David A. Foti | |

It is certified that error appears in the above-identified patent and that said Letters Patent is hereby corrected as shown below:

At column 2, line 18 of the printed patent, please change "device that define" to --device that defines--.

Signed and Sealed this
Third Day of January, 2012

David J. Kappos
*Director of the United States Patent and Trademark Office*